United States Patent [19]

Singleton, Jr.

[11] Patent Number: 5,916,084

[45] Date of Patent: *Jun. 29, 1999

[54] BATCH CENTRIFUGE FOR A MIXTURE OF SOLID AND LIQUID AND SKIM FROM MOLTEN ALUMINOUS METAL

[75] Inventor: Ogle Ridout Singleton, Jr., Richmond, Va.

[73] Assignee: Singleton Technology, Inc., Richmond, Va.

[ * ] Notice: This patent issued on a continued prosecution application filed under 37 CFR 1.53(d), and is subject to the twenty year patent term provisions of 35 U.S.C. 154(a)(2).

[21] Appl. No.: 08/610,633

[22] Filed: Mar. 4, 1996

[51] Int. Cl.⁶ .................. B04B 7/02; B04B 9/14
[52] U.S. Cl. .................. 494/60; 494/82; 494/84
[58] Field of Search .................. 494/46, 62, 82, 494/83, 84, 60; 210/364, 365, 366, 367, 363, 380.1

[56] References Cited

U.S. PATENT DOCUMENTS

| | | | |
|---|---|---|---|
| 384,718 | 6/1888 | Richards | 210/366 X |
| 566,466 | 8/1896 | Nadon | 494/56 |
| 842,257 | 1/1907 | Sharples | 494/62 X |
| 996,776 | 7/1911 | Lawson | 494/46 X |
| 1,246,267 | 11/1917 | Herr | 494/46 X |
| 1,298,451 | 3/1919 | Bryson | 210/366 |
| 1,513,337 | 10/1924 | Melotte | 366/220 X |
| 1,753,722 | 4/1930 | Schaum | 210/364 X |
| 1,787,311 | 12/1930 | Henrard | 494/62 |
| 1,802,541 | 4/1931 | Sekavec | 210/366 |
| 2,028,730 | 1/1936 | Tholl | 494/46 X |
| 3,288,361 | 11/1966 | Proudlove | 494/82 |
| 4,137,073 | 1/1979 | Singleton . | |
| 4,938,457 | 7/1990 | Singleton, Jr. . | |
| 5,401,294 | 3/1995 | Kos et al. . | |
| 5,462,578 | 10/1995 | Kos et al. . | |
| 5,525,141 | 6/1996 | Kos et al. . | |

FOREIGN PATENT DOCUMENTS

| | | | |
|---|---|---|---|
| 518376 | 5/1921 | France | 494/62 |
| 1136644 | 9/1962 | Germany | 494/46 |
| 1143150 | 1/1963 | Germany | 494/82 |
| 192989 | 2/1923 | United Kingdom | 494/62 |

*Primary Examiner*—Charles E. Cooley

[57] ABSTRACT

A suspended centrifuge apparatus has been improved by the addition of a restraint that closely maintains the original, static, vertical axis of a suspended centrifuge vessel during rotation. The restraint is preferably located to act on the lower half of the suspended vessel and preferably limits axial gyration to less than 5-degrees. A further improvement is a centrifuge bowl configuration which provides a protected surface to be acted on by a gyration restraint while partially eliminating centrifuge bowl capacity in a lower, central region subjected to inherently low centrifugal forces. An improved liquid separation process results from the use of the improved apparatus to better control the liquid discharge trajectory from the rotating centrifuge. Process control and safety are also improved.

18 Claims, 2 Drawing Sheets

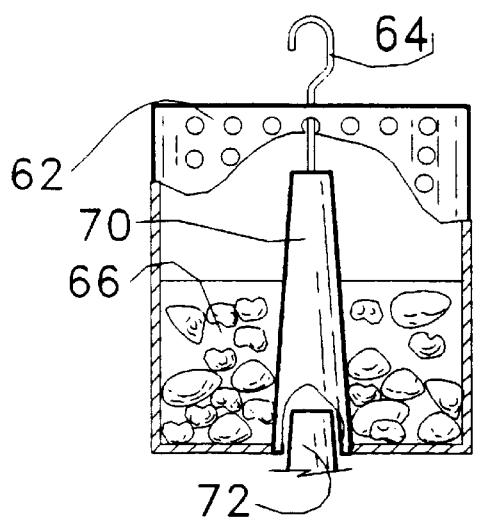
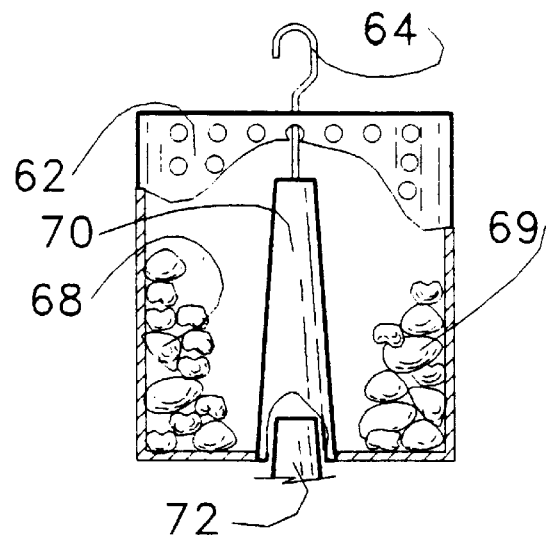
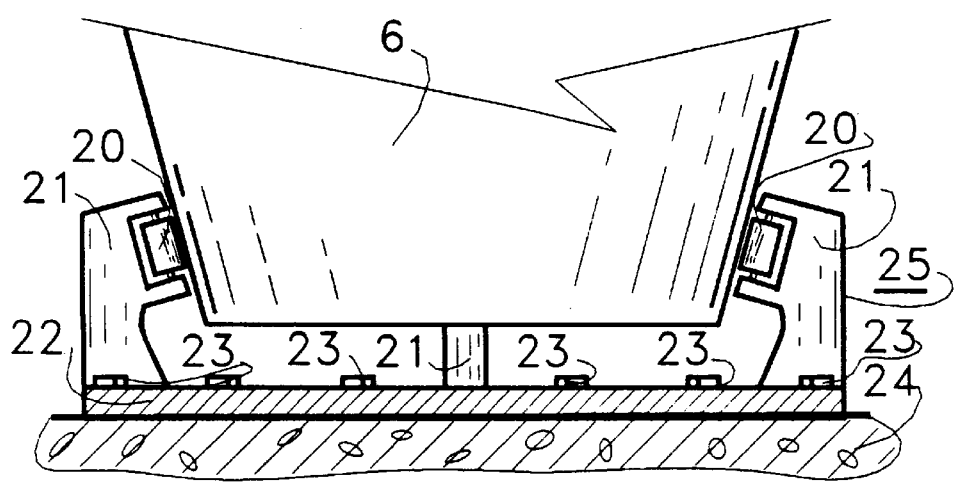

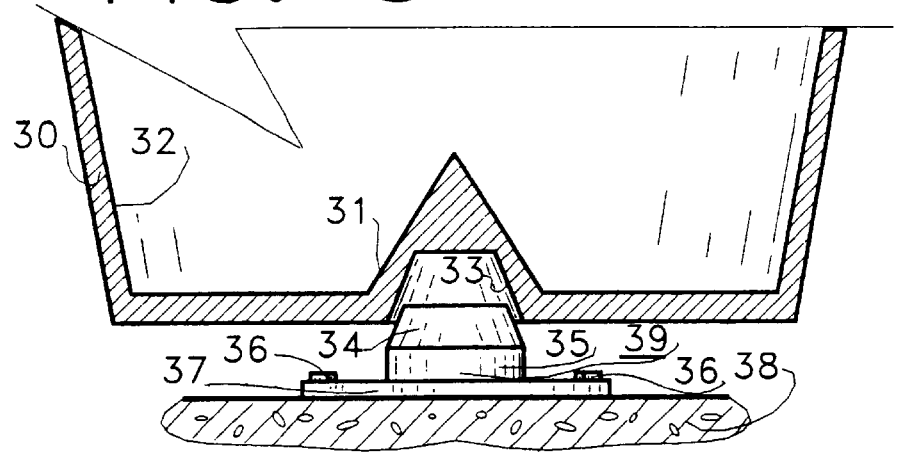
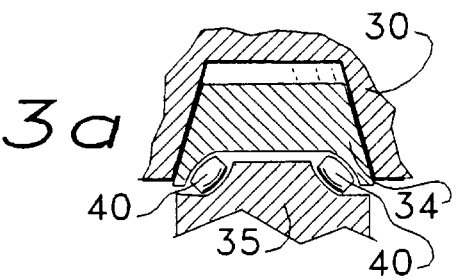
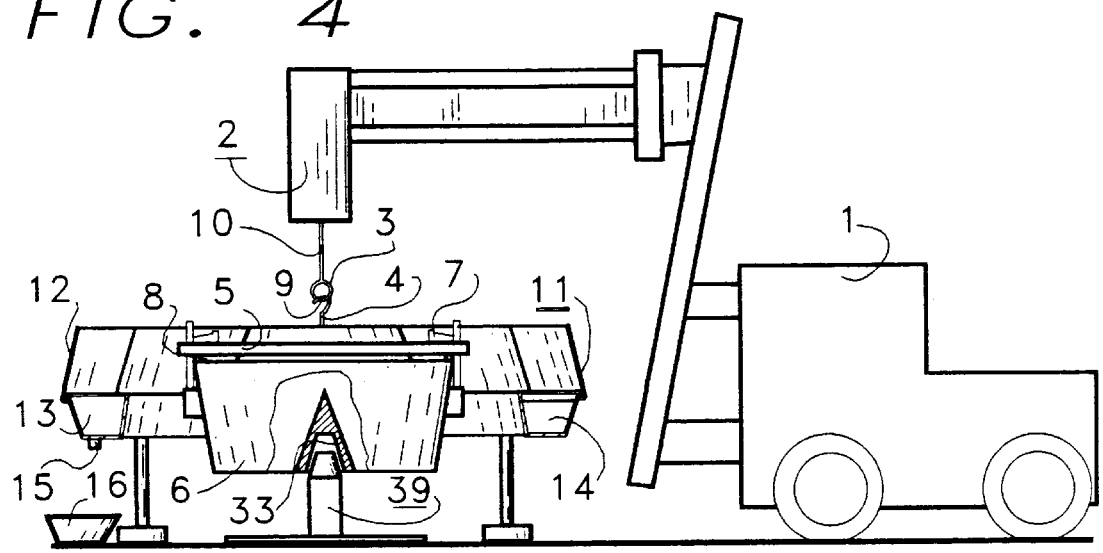

BATCH CENTRIFUGE FOR A MIXTURE OF SOLID AND LIQUID AND SKIM FROM MOLTEN ALUMINOUS METAL

This invention relates to an improvement in apparatus and method of operation of a suspended centrifuge. The improvement provides a means to maintain the initial, near vertical, static axis of a vertically suspended centrifuge close to vertical during rotation. A major projected use for a suspended centrifuge is the recovery of liquid aluminum from hot aluminous skim. The suspended centrifuge has particular advantage for use in recovering liquid from physical mixtures of at least one liquid and one solid especially from large loads where expedient loading is usually unbalanced such as the dewatering of crushed minerals. Centrifuge bowls and containers may be solid or perforate as the art dictates.

As used herein the terms aluminum or aluminous include the metal itself and alloys containing aluminum as the principal metal by weight. Skim refers to the skim or dross commonly formed on the surface of aluminum melts. Skim is further characterized as a viscous or mushy substance which floats on aluminum melts and usually contains oxide films, entrapped liquid metal, and entrained or occluded gases as well as other compounds such as metallic carbides and nitrides. Skim results from such processes as melting, especially reverberatory furnace melting, pouring of molten metal and even holding in an oxidizing environment. Skim is usually found as a distinct, easily removable layer above a melt pool and, when first formed, has been found to contain 75% or more liquid metal. Aluminum recovery from skim is improved when freshly formed skim is centrifuged as soon as possible while the metal phase is still liquid and the skim has never solidified. The terms "centrifuge vessel" or "vessel" are used to describe any suitable centrifuge assembly such as container and link or bowl, spacer, top, locking means and link as is known in the art for use in a vertically suspended centrifuge. The term "initial, static, vertical axis" is used to describe the central, near-vertical axis a loaded centrifuge vessel assumes when fully suspended; this axis is true vertical when the vessel and contents are in true balance and symmetry around the vessel's central axis a condition rarely, if ever, attained in practice.

BACKGROUND

I have been granted U.S. Pat. No. 4,938,457 for apparatus, a suspended centrifuge, for treating aluminous metal skim material. The apparatus is used in the skim reclamation method for which I was granted U.S. Pat. No. 4,137,073 which method recovers aluminum metal and produces a residue which is especially easy to process for additional value recovery. Nothing is wasted; energy consumption is low.

As pointed out in my U.S. Pat. No. 4,938,457 there are important advantages to using a suspended centrifuge to extract liquid. I have found these advantages especially important when initially unbalanced loads of greater than about 200-kilograms are to be centrifuged. The apparatus, in a commercial form to treat aluminum skim, will spin loads of about 500-kilograms (about 1,000-pounds) or more of hot aluminous alloy skim at temperatures above about 650° C. (about 1,200° F.). To retain the benefits of a suspended centrifuge I have found that at least a majority of the rotating mass must be suspended and no more than about 200-kilograms should be carried on a fixed base regardless of the mass suspended.

There is a shortcoming that can occur in the operation of the suspended centrifuge apparatus of my U.S. Pat. No. 4,938,457. It is possible, during rotation, for the suspended centrifuge vessel to lose its initial, static, vertical axis such that the vessel's central axis tends to pivot towards the horizontal about the suspension linkage interconnecting point. That is, the suspended vessel can precess or gyrate, describing a conical surface, around an initial vertical axis. Gyration, once begun, shows an apparent tendency to increase with rotational speed and perhaps with time. Loss of a vertical axis by more than about 5-degrees, measured from the linkage interconnecting point, results in an operationally inferior system both with respect to control of liquid discharge trajectory and to possible or real damaging contact between the rotating vessel and stationary objects, such as collection means, located adjacent to the gyrating vessel.

Because of the nature of gyration, a physical restraint is necessary. The force required to maintain the vertical axis of vessel rotation seems inversely related to the length from suspension linkage interconnecting point to base of bowl (a distance that can be considered analogous to a lever arm distance) and also seems related to the degree the vessel's central axis is out of true vertical. I found it best to locate the restraint as far from the pivot of gyration (the linkage interconnecting point) as is practical and to limit the freedom to gyrate to a minimum consistent with maintaining an effectively suspended centrifuge, that is, keeping all or most of the weight suspended.

OBJECTS AND ADVANTAGES

The instant invention provides a means to limit gyration of the original static vertical axis of a suspended centrifuge such that, during rotation, a suspended centrifuge vessel closely maintains a stable, near-vertical axis. The advantage to limiting axial gyration of the suspended or partially suspended vessel is to maintain process control, effluent trajectory control, liquid collection efficiency and safety.

Another object is to combine a means to limit centrifuge gyration with an improved bowl configuration. The improved bowl configuration provides for a central, conical (point up) protrusion into the bottom of the bowl interior. Although the protrusion reduces bowl capacity, it makes available a space for an above-the-nominal-bowl-bottom-plane central external surface upon which a gyration limiting means can act. The central protrusion reduces bowl capacity in a bowl region which is less affected by centrifugal force, hence, the degree of liquid extraction is not harmed and can be improved. Additionally, this improved bowl configuration provides for a flat bottom plane of the bowl which eases bowl storage and protects the external surface upon which the gyration limiting means acts from many spills and splatters which can be detrimental to operation.

BRIEF DESCRIPTION OF THE DRAWINGS

FIG. 1 is a side view in partial section of a vertical central section of a centrifuge vessel showing a schematic of an embodiment of this invention before centrifuging.

FIG. 1a is a side view in partial section of a vertical central section of a centrifuge vessel showing a schematic of an embodiment of this invention after centrifuging.

FIG. 2 is a side view in partial section showing a schematic of an embodiment of this invention.

FIG. 3 is a side view in partial section showing a schematic of an embodiment of this invention.

FIG. 3a is a side sectional view of an embodiment of a detail of this invention.

FIG. 4 is a side view, partial cutaway, showing a schematic of the applicable apparatus as disclosed in my U.S. Pat. No. 4,938,457 with the addition of an embodiment of this invention.

LIST OF REFERENCE NUMERALS 1 a lift truck which is available to provide, as needed, stability or movement either horizontally or vertically.
2 a housing attached to the lift truck, 1, and containing a rotational force source.
3 an eye-shaped, arcuate member joined to shaft 10
4 a hook shaped member mounted vertically on the central axis of 5, engaged in 3, and suspended therefrom.
5 a suspended centrifuge bowl cover, removable,
6 a suspended centrifuge bowl suspended from the cover 5
7 a locking means to secure 6 to 5
8 a controlled gap between 6 and 5 through which liquid is expelled during rotation
9 a suspension interconnecting point, contact of 3 with 4, both arcuate surfaces
10 a shaft connecting 3 with a rotational force source
11 a stationary collection station for expelled liquid shown in cutaway semi-section
12 downwardly slanting liquid deflection panel member of the collection station
13 a peripheral collection trough for expelled liquid deflected by 12
14 a spacer in the form of an inverted "V" mounted radially across 13
15 an opening in the bottom of 13 to permit liquid to flow out of 13
16 a collection pan for liquid from 13 via 15
20 A roller and shaft mounted in 21
21 An arm supporting roller and shaft, 20, and joined to base plate 22
22 A base plate supporting and joined to arm 21
23 Head of an anchor bolt, secures 22 to 24, holds 22 in place
24 Section of a concrete floor to which the base plate 22 is secured
25 Stationary bowl guidance assembly
30 A suspended centrifuge bowl, lower section, sectional center view
31 Inside surface of a central conical section within the bowl lower section 30
32 Inside surface of the outer wall of the bowl lower section 30
33 Exterior surface of the central conical section of the bowl lower section, 30, which has the shape of a frustum of a cone
34 An upper member of the stabilization unit which has the shape of a frustum of a cone and matches or is smaller than the region described by 33; 34 surmounts and is joined on its base to 35
35 A lower, cylindrical member of the stabilization unit joining 34 to 37
36 Head of an anchor bolt, secures 37 to 38, holds 37 in place
37 Base plate of the stabilization unit, joined to 35, secured to 38
38 Section of a concrete floor to which the base plate 37 is secured
39 Stationary bowl stabilization unit
40 A roller of a taper bearing shown schematically
62 A partial breakaway section of a central section of a container of a centrifuge vessel
64 An arcuate linkage member of a centrifuge vessel
66 A central section of a mixture of a liquid phase and particulate solid phases in 62 as loaded
68 A first central portion of residual particulate phases in 62 after centrifuging
69 A second central portion of residual particulate phases in 62 after centrifuging
70 A central conical riser of container 62 shown in partial breakaway section
72 An upper member of a gyratory stabilization component

DESCRIPTION OF THE INVENTION

The drawings illustrate several mechanical embodiments of the invention. For ease of understanding only the lower segment of the suspended centrifuge bowl and the added means to stabilize the vertical axis are illustrated in FIGS. 1 through 3. It is to be understood that the overall configuration of the apparatus is as shown and described in my U.S. Pat. No. 4,938,457 and is shown herein as FIG. 4 with an embodiment of this invention added.

In the drawings, FIG. 1 shows a full, vertical, front half-section of a centrifuge vessel with a breakaway to a segment of that front half The container, 62, has a central conical riser, 70, which is shown in partial breakaway section and which is formed so as to have an hollow conical section, exterior to the container, 62, which hollow conical section is open at the bottom. The bottom internal and external diameters of the conical riser, 70, are larger than the top internal and external diameters, respectively. The riser, 70, is surmounted with a compound arcuate link, 64, whose central axis is coextensive with the central axis of the centrifuge container and is in the form of a hook so that it may engage and disengage from a driven, arcuate, suspending link such as an eye, not shown. A portion of the upper member of an independently mounted gyratory stabilization component, 72, is shown in position to act to stabilize gyration of the centrifuge vessel if it were rotated to expel liquid. Shown schematically is a mixture of liquid and particulate solid phases, 66, as they would appear loaded randomly into the section of the container before centrifuging.

In the drawings, FIG. 1a shows schematically how the centrifuge vessel section depicted in FIG. 1 would appear after centrifuging to remove most of the liquid and contain enriched solid particulate phases portions of which are designated, 68 and 69, designations 62, 64, 70 and 72 having the same description as in FIG. 1.

In the drawings FIG. 2 shows a side view of the exterior of the lower segment of a suspended centrifuge bowl, 6 as lowered into position and ready for rotation and liquid extraction. The bowl, 6, is shown positioned such that it does not touch the fully shown members of the shown section of the stationary bowl guidance assembly, 25. The stationary bowl guidance assembly, 25, is composed of roller and shaft, 20, mounted in structural arms, 21, which structural arms are securely joined to a base plate, 22, shown in section which is secured in a fixed position by conventional anchor bolts, the heads, 23, of which are shown, to a massive, fixed object represented in FIG. 2 by a concrete floor section, 24. In the position shown, the bowl, 6, may be raised, lowered or rotated and, if rotated, the extent of horizontal movement during rotation is limited by the stationary bowl guidance assembly, 25.

In the drawings FIG. 3 shows a side view of a lower section of a suspended bowl, 30, as lowered into position and ready for rotation and liquid extraction. The bowl lower section, 30, shows an outwardly slanting interior bowl wall surface, 32, an interior central conical protrusion having a downwardly expanding surface, 31, and a vertical central axis which is common to the bowl and to an exterior cavity having the shape of a frustum of cone with a surface, 33. The bowl lower section, 30, is shown positioned such that exterior surface, 33, does not touch fully the stationary bowl stabilization unit, 39 and the exterior of the main bottom surface of the suspended bowl lower section, 30, is substantially below the uppermost portion of the stationary bowl stabilization unit, 39. The stationary bowl stabilization unit, 39, is composed of an upper member which is configured as a conical frustum, 34, having a central, vertical axis which is supported by and joined to a cylindrical member, 35, having a common central axis and joined to a base plate, 37, which is secured in a fixed position by conventional anchor bolts, the heads, 36, of which are shown, to a massive, fixed object represented in FIG. 3 by a concrete floor section, 38. The exterior surface of the upper member, 34, is dimensioned so as to fit loosely the equivalent lower region of suspended bowl exterior cavity surface, 33. In the shown position the suspended bowl, represented by lower section, 30, may be raised, lowered or rotated and, if rotated, the extent of horizontal movement during rotation is limited by the stationary bowl stabilization unit, 39.

In the drawings FIG. 3a shows in section a partial detail of a bowl lower section, 30, resting partially on the upper member, 34, of a stationary bowl stabilization unit (FIG. 3, 39) having the general arrangement shown in FIG. 3. In this detail an embodiment is shown wherein a roller bearing, schematically illustrated by the rollers, 40, connects the upper member, 34, to the lower member, 35, so that the upper member, 34, can rotate with respect to member, 35, when the bowl is rotated.

In the drawings FIG. 4 shows, in partial, cutaway section, the apparatus of U.S. Pat. No. 4,938,457 in a condition ready to begin centrifuging and with the addition of an embodiment of the instant invention as described for FIG. 3 above showing, in section, an internal, hollow cone in the centrifuge bowl, 6, and gyratory control bowl stabilization unit, 39, cooperating with exterior surface, 33. Lift truck, 1, provides mobility to position the suspended centrifuge and also a suitable reaction mass for rotational force. Rotational force is provided by a source in housing, 2, through shaft, 10, to eye, 3, from which is suspended hook, 4, resulting in interconnecting point 9 between eye, 3, and hook, 4. Hook, 4, is rigidly mounted to and above the centrifuge bowl cover, 5, and on the central vertical axis common to the cover, 5, and bowl, 6. Locking means, 7, secure the bowl, 6, to the adjacent bowl cover, 5, producing a controlled gap, 8, through which liquid may be expelled. Expelled liquid follows a ballistic trajectory to the stationary collection station, 11. The expelled liquid or semisolid is deflected from wall, 12, into trough, 13, from which liquid may flow through opening, 15, into collecting pan, 16. At least one inverted "V" spacer, 14, is located within the trough to prevent the formation of a solidified product ring. A particular design of collection station is not essential to the use of a suspended centrifuge but a design is given as an example for ease of understanding of the overall operation.

Operation of the Invention

The operation of the instant invention can be most easily understood and appreciated if the overall operation of a suspended skim centrifuge is first understood and then the problem to be corrected is described. Hence, the basic operation of the vertically suspended, skim centrifuge, shown in FIG. 4, will be reviewed and a problem that can occur during operation of the apparatus when used without gyratory restraint during rotation to expel liquid will be described.

Basic operation:

As an example to arrive at the condition depicted in FIG. 4 the centrifuge bowl, 6, has been loaded with fresh, hot skim at a reverberatory furnace door. A lift truck, 1, with a raised, attached beam and housing, 2, for a rotational force source connected to shaft 10 and eye, 3, was used to pick up the bowl cover, 5, by engaging the hook, 4 and then was used to move the cover, 5, adjacent to the bowl. The bowl cover, 5, was locked to the bowl by locking means, 7, forming a controlled opening, 8, between the bowl, 6, and the cover, 5. The lift truck then picked up the assembled, loaded, centrifuge vessel, (4, 5, 6 and 7), transported it to the collection station, 11, and lowered the centrifuge vessel to the position shown in FIG. 4.

Under the best conditions, when there is no problem, the rotational force source is activated (reacting against the beam and lift truck or other suitable reaction mass such as a jib crane), shaft 10 turns, eye, 3, turns, hook, 4, turns and the centrifuge vessel spins quiescently about a vertical or near-vertical central axis. The spinning, suspended centrifuge vessel expels molten metal through gap, 8, into collection unit, 11. A central, vertical axis is maintained during spinning because of the force of gravity acting on the spinning vessel and because only very low frictional force is capable of being developed at the arcuate surfaced, interconnecting point, 9.

The process is completed by stopping rotation, removing the suspended centrifuge from the collection unit, demounting the vessel, (4, 5, 6, & 7), unlocking the locking means, 7, and removing cover, 5. The bowl, 6, now contains hot residue with some residual aluminum. The bowl is usually covered to reduce access of air to the hot residue (because hot residues can sometimes burn), and allowed to cool prior to emptying. The cool residue can then be further processed. The recovered aluminum is removed from the collection station, 11, and the collection pans, 16.

The problem to be overcome:

A problem arises when the spinning centrifuge vessel, lacking a gyratory restraint means as shown by centrifuge bowl surface, 33, and stationary bowl stabilization unit, 39, shown in FIG. 4, does not closely maintain its initial, static, vertical axis during rotation. A gyration can occur in which the central axis of the centrifuge vessel is displaced from the vertical, pivoting about the interconnecting point, 9. The interconnecting point, 9, is the pivot of gyration. Obviously, the gyration is undesirable and can lead to inoperability due to both undesirable discharge trajectory and disastrous collision of the rotating, gyrating centrifuge vessel with the stationary collection station or other nearby objects. Once started, gyration seems to become worse with increased rotational speed and, possibly with time, although, since gyration results in a dangerous condition, observation has been meager.

Problem solution requirements:

Correcting the problem requires restraining the suspended centrifuge vessel from gyrating about the initial, static, vertical axis more than a few degrees. It has been found that it is best to restrain gyration as far away from the pivot point of gyration (FIG. 4, 9) as practical. Two important, practical issues are: the need to maintain the characteristic advantages of suspension during centrifuging and the need to retain simplicity and ease of loading the centrifuge into a collection unit.

There are many means to supply the proper restraining force. FIGS. 2 and 3 illustrate schematically simple, straight-forward mechanical methods to provide the restraint needed. The illustrated methods will be discussed in detail in the following section; however, it should be noted that there are many other, more sophisticated means which are obvious to those skilled in the art which may be employed to achieve the same ends; for example, shock absorbers can be added to the supporting arms of FIG. 2. To reduce frictional effects lubricants can be used on potential contact regions and the regions of potential or actual contact on stationary bases can be enabled to rotate by suitable means such as employing bearings to render surfaces rotatable in a fixed position as shown, for one embodiment, in the detail of FIG. 3a.

Operation of the invention FIG. 1 and FIG. 1a:

To better understand the unique change in centrifuge vessel balance problem addressed by the instant invention it is helpful to contrast FIG. 1 and FIG. 1a. FIG. 1 and FIG. 1a both show a full vertical front half section of a centrifuge vessel with a breakaway to a segment of that front half FIG. 1 shows container, 62, as loaded with a mixture of liquid and solid particulate phases prior to centrifuging to remove the liquid phases. There is a random, gravitationally influenced distribution of solid and liquid in the container as illustrated schematically in the segment, 66, giving a given load in the container a particular center of gravity.

When the container, 62, is rotated to expel liquid, centrifugal forces become paramount, liquid is expelled, solid particles and residual liquid change positions. The center of gravity of the container undergoes changes in position as rotation continues. A possible configuration of the same segment of container, 62, after centrifuging is depicted in FIG. 1a. It is obvious that the balance of the container has changed from FIG. 1 to FIG. 1a. It has been found that these changes in center of gravity of the centrifuge vessel can cause the link suspended centrifuge vessel to gyrate about its original initial static vertical axis, the gyrations becoming greater in magnitude with increasing speed of rotation. Such gyration is inherent in centrifuging a mixture of liquid and solid particulate phases to remove the liquid and retain the solids and is at its greatest when liquid is being expelled and the solids are moving and shifting in the centrifugal force field at the higher revolutions.

Gyrations beyond a controlled amount can distort or even interrupt liquid flow out of the vessel and can also cause undesirable vessel contact with nearby stationary objects. The instant invention acts to provide a structurally sound means to limit gyratory motion of a link suspended centrifuge vessel to a controlled and predetermined extent such that liquid can be expelled in preestablished trajectories and the centrifugal separation can be accomplished with safety.

Operation of the invention FIG. 2:

The parts of the schematic will be described first. In the drawings, FIG. 2 shows a lower section of a flat bottomed bowl, 6, which is positioned within the confines of a stationary bowl guidance assembly, 25. The guidance assembly, 25, consists of a plurality of structural arms, 21, surmounted by rollers, 20, which are slanted to the slant of the exterior of the suspended centrifuge bowl, 6, and extend inwardly beyond the reach of the arms, 21. The arms are joined securely to a structural base plate, 22, which is rendered stationary by conventional anchor bolts, heads, 23, shown, which anchor the base plate, 22, to a massive base such as the section of concrete floor, 24.

The bowl, 6, has been lowered into the collection unit, not shown, to a distance such that a substantial portion of the lower part of the suspended centrifuge bowl, 6, is within the horizontal confines of the stationary bowl guidance assembly, 25. The apparatus now looks to be as shown in FIG. 4 with the substitution of the stationary bowl guidance system, 25, for the stationary bowl stabilization unit, 39. Either statically or dynamically bowl, 6, may touch one or more of the rollers, 20; however, at least most of the mass of the centrifuge vessel must be suspended. An instrumental means to quantify the mass suspended may be used rather than either relying on operator judgement or requiring that all of the load be suspended as judged by operator observation of the suspension linkage (FIG. 4, 3 and 4).

When the centrifuge vessel, positioned as shown in FIG. 2, is rotated to expel liquid, the centrifuge vessel is held closely to its original static vertical axis by the restraint of the rollers, 20, acting as part of the stationary bowl guidance assembly, 25. Hence, operation to expel liquid from the suspended centrifuge can be carried out without the disruption and danger associated with unwanted gyration of the suspended centrifuge.

Operation of the invention FIG. 3 and FIG. 3a:

The parts of the schematic will be described first. In the drawings, FIG. 3 shows a section, 30, through the center of a lower part of an improved suspended centrifuge bowl. The bowl has a wall the interior surface of which, 32, is sloping outwards and upwards and a central conical section in the form of an inverted "V" section whose exterior, 31, slopes outwards and downwards. The bowl may be of one material or of a composite of several materials or lined. One purpose of the surfaces just described is for surface, 31, to direct liquid to the bottom periphery and for surface, 32, to direct liquid to the upper rim of the bowl when the bowl and its contents are under the influence of rotational forces. The central conical protrusion into the interior of the bowl serves two uses: it occupies a zone that is relatively a dead or low force zone with respect to rotational forces and provides a space for a central cavity in the shape of a conical frustum which has interior surface, 33 which is terminated at one end with the bottom surface of the bowl lower section, 30.

The lower bowl section, 30, is shown positioned such that a substantial part of surface, 33, is below and surrounds the uppermost part of the stationary bowl stabilization unit, 39. The stationary bowl stabilization unit consists of an upper section in the shape of a conical frustum, 34, with an exterior conical surface congruent with a lower section of surface, 33. The upper member, 34, surmounts a lower cylindrical member, 35, which is securely mounted to a structural base plate, 37. The base plate is rendered stationary by conventional anchor bolts, heads, 36, shown, which anchor the base plate, 37, to a massive base such as the section of concrete floor, 38.

The improved suspended centrifuge bowl shown here in partial section, 30, has been lowered into the collection unit, not shown, to a distance such that a substantial portion of the surface, 33, surrounds a substantial portion of the base upper conical frustum, 34 of the stationary bowl stabilization unit, 39. The overall, suspended apparatus would now look as shown in FIG. 4.

Bowl surface, 33, may touch a portion of unit, 39; however, at least most of the mass of the centrifuge must be suspended. A means to quantify the mass suspended may be used rather than relying on operator judgement or requiring that all of the load be suspended as determined by operator observation of the suspension linkage (FIG. 4, 3 and 4) and vessel orientation or movement. In a modified embodiment, shown in FIG. 3a, a bowl lower section, 30, rests on an upper member, 34, of the stationary bowl stabilization unit, (FIG. 3, 39) with a weight load not exceeding the lesser of about 200-kilograms or half the weight of the loaded bowl. A bearing, schematically illustrated by rollers, 40, locates upper member, 34, and permits easy rotation of, 34, with respect to lower, cylindrical member, 35.

When the suspended centrifuge vessel, positioned as illustrated in FIG. 3 or FIG. 3a, is rotated to expel the liquid, it is held closely to the original static vertical axis by the restraint of upper member, 34, of the stationary bowl stabilization unit, 39 (FIG. 3) acting against the bowl lower section, 30, (surface, 33, FIG. 3). Hence, operation to expel liquid from the suspended centrifuge can be carried out smoothly and rapidly without the disruption and danger associated with unwanted gyration of the suspended centrifuge vessel.

Conclusion and Scope of the Invention

As can be seen from the above, the instant invention improves the operation of a suspended centrifuge apparatus by employing means which limit the rotation axis of a vertically suspended centrifuge vessel closely to its original, static, vertical axis preventing significant gyration of the central axis of the vessel. Thus, the desired liquid discharge trajectory is maintained during spinning and damage to any adjacent liquid collection station due to axial precession of the centrifuge vessel is avoided.

As illustrated in FIG. 3, a means for restraint of centrifuge vessel gyration was combined efficiently with a bowl design which removes from the interior of the bowl a region into which liquid will flow by gravity but which is minimally affected by rotational forces. Removal of that region from the active volume of the bowl tends to improve the degree of overall liquid removal from the bowl contents; the load volume so displaced provides, in part, space for a protected surface, 33, which is an element of the gyration restraint means.

The above description of the apparatus employed and the operational methods used contain many specificities; however those specificities should not be construed as limitations on the scope of the invention, but as exemplifications of preferred embodiments thereof. Many other variations are possible as are known to those skilled in the art. Accordingly, the scope of the invention should not be determined by the embodiments illustrated herein but by the appended claims and their legal equivalents.

I claim:

1. A suspended centrifuge apparatus for the removal of liquid from a physical mixture of at least one liquid phase and at least one particulate solid phase, said physical mixture including, inter alia, hot aluminous skim having a liquid aluminum component, said suspended centrifuge apparatus comprising:

a centrifuge vessel;

a structural support comprising a means for suspending, for positioning and for rotating a first, compound, arcuate surfaced, linkage component, enabling suspension, positioning and rotation of said centrifuge vessel;

a second, arcuate surfaced, linkage component mountably and demountably engageable with the first linkage component, having a central axis and attached to said centrifuge vessel;

said first linkage component and the second linkage component, when fully engaged, forming a linkage interconnection point;

said centrifuge vessel comprising: at least one peripheral opening of controlled extent, a vertical, central axis, said vessel being generally symmetrical about said vertical, central axis, and having walls and a closed bottom with an indentation therein, and said central axis of said second linkage component capable of being located coextensive with said vertical, central axis of said centrifuge vessel;

said centrifuge vessel when loaded, suspended from said structural support and, prior to rotation, assuming an initial, static, vertical axis as measured from said linkage interconnection point;

said indentation defining a generally conical, rigid, exterior surface of said centrifuge vessel and having a central axis coextensive with said vertical, central axis of said centrifuge vessel, the bottom diameter of said indentation being greater than the upper diameter of said indentation;

a first, centrifuge vessel, gyration restraint component being a portion of said generally conical, rigid, exterior surface of said indentation on the exterior of said centrifuge vessel;

a second, centrifuge vessel, gyration restraint component being fixed in space and comprising: an exterior surface able to cooperate with a portion of said first, centrifuge vessel, gyration restraint component and having an upper, exterior portion smaller by a predetermined amount than a lower, exterior portion of said first, centrifuge vessel, gyration restraint component; and during liquid extraction, said suspended centrifuge vessel being positioned with said first, centrifuge vessel, gyration restraint component surrounding proximate a predetermined distance from the cooperating portion of said second, centrifuge vessel, gyration restraint component, thereby enabling, during centrifuging, said vertical, central axis of said centrifuge vessel to be maintained closely to said initial, static, vertical axis measured from said linkage interconnection point;

whereby, the loaded, suspended, and positioned centrifuge vessel is enabled by a predetermined speed and time of rotation under gyration restraint to expel most of said at least one liquid phase and retain most of said at least one particulate solid phase thereby effectively separating said physical mixture.

2. The suspended centrifuge apparatus of claim 1 further comprising: a liquid collecting means disposed around and spaced a predetermined distance from said second centrifuge vessel gyration restraint component and, at the same time, disposed with predetermined spatial clearance around said centrifuge vessel when said centrifuge vessel is positioned for rotation and when rotating, so that said liquid collecting means is capable of receiving material expelled from said at least one peripheral opening of said centrifuge vessel.

3. The suspended centrifuge apparatus of claim 1 wherein said centrifuge vessel comprises: a bowl, a detachable bowl cover with means to lock said detachable cover to said bowl.

4. The suspended centrifuge apparatus of claim 3 wherein said second, arcuate surfaced, linkage component is mounted to said detachable bowl cover.

5. The suspended centrifuge apparatus of claim 1 wherein at least one element of said second, centrifuge vessel, gyration, restraint component is rotatable about a fixed axis.

6. The suspended centrifuge apparatus of claim 1 wherein said predetermined distance of said exterior cooperating portion of said second, centrifuge vessel, gyratory restraint component is positioned from said first, centrifuge vessel, gyratory restraint component during centrifuging such that said central, vertical axis of said centrifuge vessel is limited to a gyration of not more than about five degrees from the initial, static, vertical axis of said centrifuge vessel as measured from said linkage interconnection point.

7. The suspended centrifuge apparatus of claim 1 wherein said structural support is positionable.

8. The suspended centrifuge apparatus of claim 1 whereby said suspended centrifuge apparatus separates at least a portion of said liquid aluminum component from said hot aluminous skim.

9. A suspended centrifuge apparatus for the separation of a physical mixture of at least one liquid phase and at least one solid particulate phase into a retained, enriched in solids residue and an expelled liquid enriched phase, said physical mixture including hot aluminous skim having a liquid aluminum metal component said suspended centrifuge apparatus comprising:

a centrifuge vessel;

a structural support comprising a means for suspending, for positioning and for rotating a first linkage member having a compound arcuate linking surface and enabling suspension, positioning and rotation of said centrifuge vessel;

said centrifuge vessel comprising: a bowl and a second linkage member having an arcuate linking surface mountably and demountably engageable with said first linkage member;

said bowl having a central, vertical axis and said second linkage member having a vertical, central axis coextensive with said central, vertical axis of said bowl, said bowl being generally symmetrical, inside and out about said central, vertical axis and having a rigid side wall connected to a bottom wall, said bowl capable of holding and transporting a predetermined quantity of said physical mixture and holding and transporting said retained, enriched in solids residue, said bowl having on a lower portion of said rigid side wall, an exterior surface being a surface of revolution selected from the group comprising a cylinder and a cone, said lower portion of said rigid side wall exterior surface being a first gyratory restraint member;

said centrifuge vessel having at least one peripheral opening;

said first linkage member and said second linkage member when fully engaged forming a linkage interconnection point;

said centrifuge vessel, when loaded, suspended from said first linkage member and prior to rotation assuming an initial static vertical axis as measured from said linkage interconnection point;

a second gyratory restraint member, fixed in space comprising:

a means to cooperate with said first gyratory restraint member so that, when the loaded, suspended centrifuge vessel is positioned with said first gyratory restraint member in a predetermined, cooperative relationship with said second gyratory restraint member, said second gyratory restraint member provides a guideway within which a substantial portion of said first gyration restraint member can freely rotate and with said guideway limiting the gyratory motion of said central vertical axis of said centrifuge vessel closely to said initial, static, vertical axis of said centrifuge vessel as measured from said linkage interconnection point;

whereby, said loaded, suspended centrifuge vessel is enabled, by a predetermined speed and time of rotation and under gyratory restraint, to expel most of said at least one liquid phase and retain most of said at least one solid particulate phase; thereby, effectively separating said physical mixture.

10. The suspended centrifuge apparatus of claim 9 with the addition of a liquid collecting means, disposed proximate to said second gyratory restraint member and surrounding by a predetermined distance and extent from said centrifuge vessel when said centrifuge vessel is positioned for liquid extraction so that, during rotation, expelled material is intercepted and collected.

11. The suspended centrifuge apparatus of claim 10 wherein said predetermined, cooperative relationship between said first and second gyratory restraint members is such that the gyration of said centrifuge vessel during rotation is restrained so that clearance is maintained between said centrifuge vessel and said liquid collecting means.

12. The suspended centrifuge apparatus of claim 10 whereby said suspended centrifuge apparatus separates at least a portion of said liquid aluminum metal from said hot aluminous skim.

13. The suspended centrifuge apparatus of claim 9 wherein said centrifuge vessel comprises: said bowl, a detachable bowl cover with means to lock said detachable bowl cover to said bowl.

14. The suspended centrifuge apparatus of claim 9 wherein said second gyratory restraint member has at least one component rotatable about a fixed axis which can contact and guide said first gyratory restraint member during rotation of said centrifuge vessel.

15. The suspended centrifuge apparatus of claim 9 wherein said predetermined, cooperative relationship between said first and second gyratory restraint members is such that the gyration of said central, vertical axis of said centrifuge bowl during rotation of said centrifuge vessel does not exceed about five degrees as measured from the linkage interconnection point.

16. The suspended centrifuge apparatus of claim 9 wherein said structural support is positionable.

17. The suspended centrifuge apparatus of claim 9 whereby said suspended centrifuge apparatus separates at least a portion of said liquid aluminum metal from said hot aluminous skim.

18. The suspended centrifuge apparatus of claim 9 whereby said suspended centrifuge apparatus separates at least a portion of said at least one liquid phase from said at least one solid particulate phase.

* * * * *